W. O. CLOUGH.

Improvement in Door-Checks.

No. 126,445.                          Patented May 7, 1872.

Witnesses:
John Becker
Geo. W. Mabee

Inventor:
W. O. Clough
per Munn & Co
Attorneys.

UNITED STATES PATENT OFFICE.

WILLIAM OVERTON CLOUGH, OF LEXINGTON, KENTUCKY.

IMPROVEMENT IN DOOR-CHECKS.

Specification forming part of Letters Patent No. 126,445, dated May 7, 1872.

Specification describing a new and useful Improvement in Door Check or Holder, invented by WILLIAM O. CLOUGH, of Lexington, in the county of Fayette and State of Kentucky.

Figure 1:
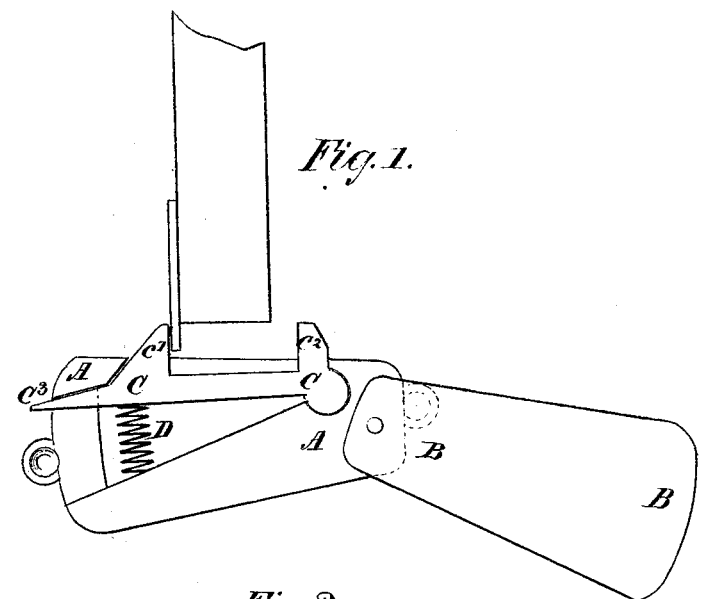
Figure 2:
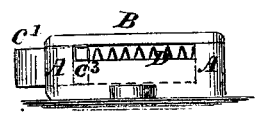
Figure 3:
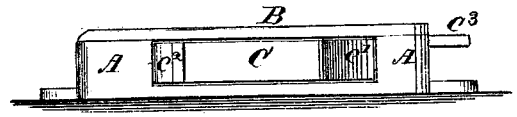

Figure 1 is a top view of my improved door check or holder, the top plate being turned back to show the construction. Fig. 2 is an end view of the same. Fig. 3 is a front view of the same.

Similar letters of reference indicate corresponding parts.

My invention has for its object to furnish an improved device for checking a door when opened, and holding it while open, so that it cannot swing about and slam, and which shall be simple in construction, inexpensive in manufacture, convenient in use, and effective in operation; and it consists in the construction and combination of the various parts of the device, as hereinafter more fully described.

A B is the box or case of the device, which is made in two parts. One part, A, is made thick, and is recessed to receive the catch-bar C. The other part, B, is made thin, and is designed to cover and protect the catch-bar. The inner end of the catch-bar C is rounded off, and fits into a round recess in the body of the thicker part A. Upon the forward side of the catch-bar C is formed two catches, $c^1$ $c^2$. The forward side of the forward catch or projection $c^1$ is inclined, as shown in Figs. 1 and 3, so that when the door strikes against it the catch-bar C may be pushed back, allowing the door to pass the said catch $c^1$. The other or rear projection $c^2$ is intended to stop the door after it has passed the first catch. Upon the forward end of the catch-bar C is formed a toe-piece, $c^3$, which projects through a slot in the end of the case A, so that the catch-bar C can be readily pushed back with the foot to release the door and allow it to be closed. The catch-bar C is held forward by a coiled wire spring, D, placed in the recess in the case A, at the rear side of the catch-bar C, as shown in Fig. 1. The case A B should have holes formed through it, or lugs formed upon it, to receive the screws by which it is secured to the floor.

The device may be placed either side down, according as the door swings in one or the other direction. In case the door swings an inch or an inch and a half above the floor, the device should be placed upon its rear edge and secured to the floor in that position, so that the lower edge of the door may catch upon it.

The door is designed to have a small metallic plate attached to it, projecting a quarter or half an inch, and which is designed to operate upon the holder A B C D. This enables the holder to be made smaller, and consequently cheaper, than it could be if it had to operate upon the body of the door itself.

Having thus described my invention, I claim as new and desire to secure by Letters Patent—

An improved door check or holder, formed by the combination of the box or case A B, catch-bar C $c^1$ $c^2$ $c^3$, and coiled wire spring D with each other, said parts being constructed and operating substantially as herein shown and described, and for the purpose set forth.

WILLIAM OVERTON CLOUGH.

Witnesses:
  M. COCHRAN,
  SAM. A. WHITE.